Dec. 8, 1925.  
G. H. ACKER  
1,564,742  
WORM GEAR REDUCTION UNIT  
Filed Oct. 22, 1923  2 Sheets-Sheet 1
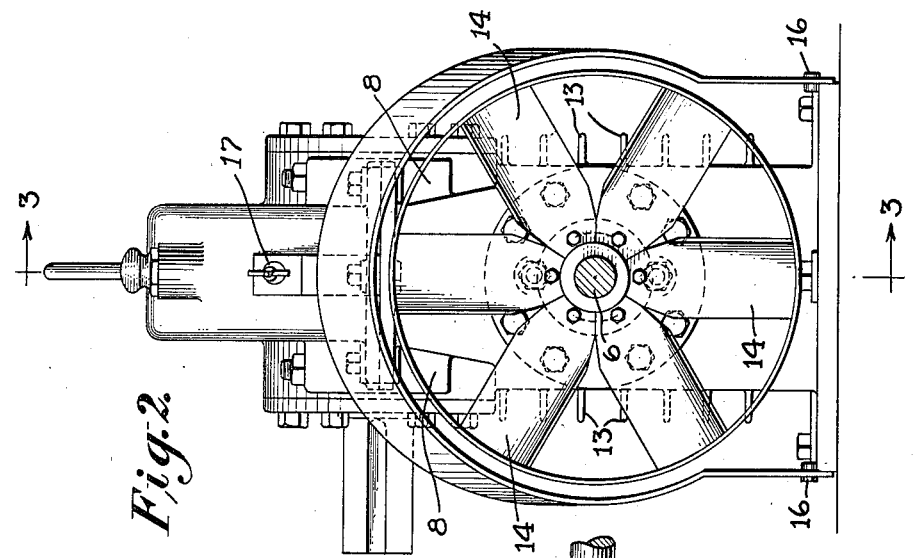
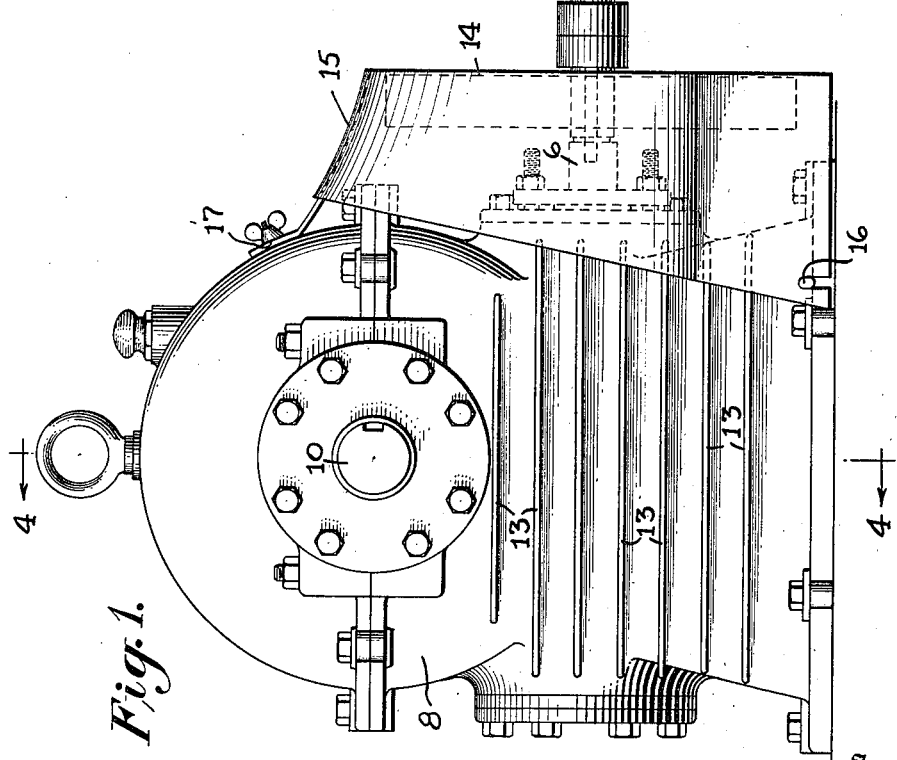
Inventor  
GEORGE H. ACKER  
By Attorney

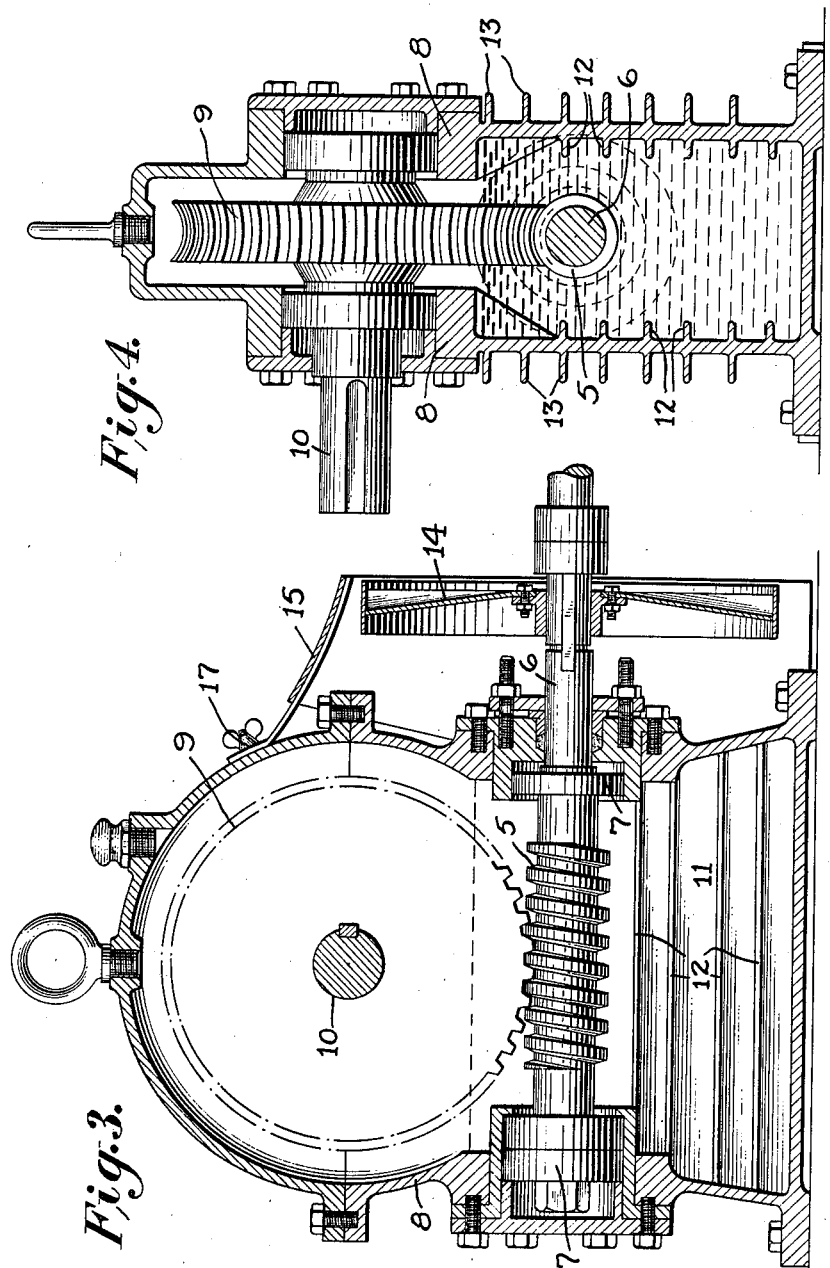

Patented Dec. 8, 1925.

1,564,742

UNITED STATES PATENT OFFICE.

GEORGE H. ACKER, OF CLEVELAND, OHIO, ASSIGNOR TO THE CLEVELAND WORM AND GEAR COMPANY, OF CLEVELAND, OHIO, A CORPORATION OF OHIO.

WORM-GEAR REDUCTION UNIT.

Application filed October 22, 1923. Serial No. 669,886.

*To all whom it may concern:*

Be it known that I, GEORGE H. ACKER, a citizen of the United States, and resident of Cleveland, in the county of Cuyahoga and State of Ohio, have invented certain new and useful Improvements in Worm-Gear Reduction Units, of which the following is a specification.

This invention relates to worm gear reduction units and one of the more important objects of the invention is to overcome the limitations in power output which have been imposed upon devices of this character by the heating of the parts under load. This heating is particularly noticeable with the higher ratios of reduction where the internal heat developed is greater, due to lower operating efficiency. The heating has the effect of thinning out the lubricating oil to a dangerous point and also of causing the parts to expand out of correct adjustment. These difficulties have been so serious that in the past it has been the practice to use greatly over-size units.

By means of the present invention the difficulties and limitations referred to are eliminated and the practical utilization of the full-rated horse power of worm gear reduction units is made possible.

In the accompanying drawings there is illustrated a practical embodiment of the invention wherein the desired results are obtained, but as this illustration is primarily for purposes of disclosure, it will be understood that the structure may be modified in various ways without departure from the broad intent and scope of the invention as hereinafter defined and claimed.

Figure 1 of the drawings referred to is a side elevation of the worm gear reduction unit of well-known type having features of the invention incorporated therein;

Figure 2 is an end view of the same;

Figure 3 is a longitudinal sectional view taken on substantially the plane of line 3—3 of Figure 2; and Figure 4 is a transverse sectional view taken on substantially the plane of line 4—4 of Figure 1.

In the illustration the worm is designated 5 and is shown carried by a shaft 6 journalled in bearings 7 in a gear case 8. The gear which cooperates with the worm is shown at 9 carried by the shaft 10 journalled in the upper portion of the same case.

The gear case is shown in Figure 4 as differing from the conventional in having vertical side walls spaced fairly wide apart to provide a well 11 of substantial proportions for supporting a large body of lubricant as a bath about the contacting portions of the worm and gear. Also, the side walls of the well are shown as having heat absorbing fins 12 extending inwardly into the body of the contained lubricant. External heat dissipating fins are shown at 13 on the outside of the case and both these and the internal fins are indicated as extending longitudinally, horizontal and parallel with the worm shaft.

A forced cooling of the parts is effected in the present disclosure by an air circulating fan 14 driven by and shown as mounted directly upon the projecting portion of the worm shaft at a point close to the end of the casing so as to create a flow of cooling air over the casing and lengthwise of the projecting fins.

In gear reduction units of this character the worm shaft is a relatively high speed shaft, which means that efficient cooling can be effected by mounting a fan directly upon this shaft. This fan absorbs but a small proportion of the energy and by keeping the parts at a proper temperature enables the reduction unit to be used practically up to the maximum of mechanical power which it is capable of transmitting.

To control the blast of cooling medium and obtain full benefit of the same, a hood 15 may be provided about or closely adjacent the fan for confining the air current and directing it along the sides of the gear case. This hood may be shaped to form a guard about the fan and may be detachable, supported upon the end of the gear case by lugs 16 at the bottom and a screw fastening 17 at the top.

The use of the cooling fins is particularly desirable for large size units. The internal fins take up the heat surrounding the worm and the external fins conduct this heat out into the stream of cooling medium. A rapid dissipation of heat is thereby effected, enabling the lubricant to be maintained at a proper working temperature and the gear reduction unit to be worked practically at its maximum capacity.

Having thus described my invention, I claim:

A worm gear reduction unit comprising a gear case having an oil well, a high speed shaft journaled in said case and carrying a worm operating in the oil well, a lower speed shaft journaled in the case and carrying a gear cooperating with the worm and an air circulating fan on the extension of the high speed worm shaft outside the casing of greater diameter than the width of the casing to create flow of cooling air over the sides of the casing containing the oil well to thus dissipate heat generated by the gears through direct conduction to the air stream, thereby enabling the gear unit to carry substantially the full load of which it is mechanically capable.

Signed at Cleveland in the county of Cuyahoga and State of Ohio this 13th day of October A. D. 1923.

GEORGE H. ACKER.